Figures 1, 2, 3:
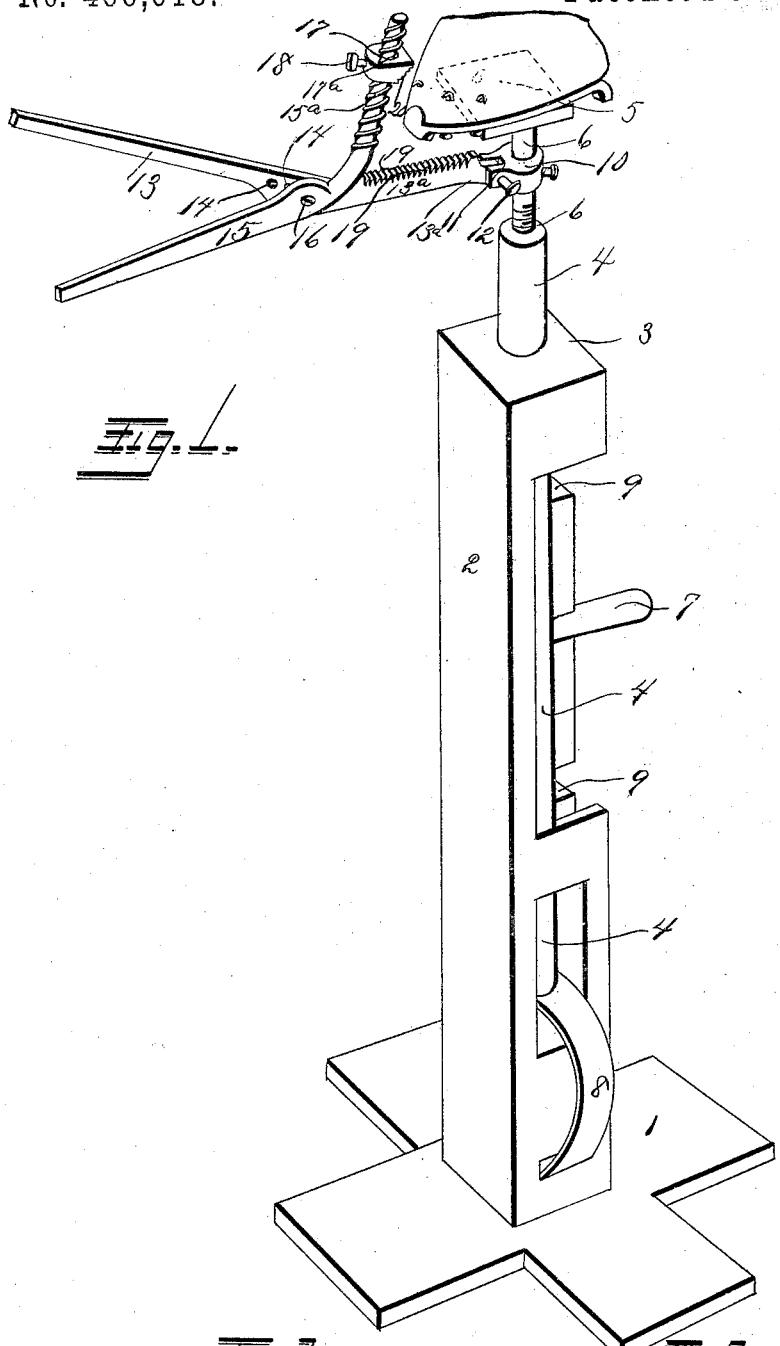

(No Model.)

J. A. McDONALD.
COMBINED HORSESHOER'S STOOL AND CLINCHER.

No. 466,618. Patented Jan. 5, 1892.

WITNESSES
INVENTOR:
J. A. McDonald
by W. J. Fitzgerald & Co.
Attorneys.

UNITED STATES PATENT OFFICE.

JOHN A. McDONALD, OF BRITTON, SOUTH DAKOTA.

COMBINED HORSESHOER'S STOOL AND CLINCHER.

SPECIFICATION forming part of Letters Patent No. 466,618, dated January 5, 1892.

Application filed June 13, 1891. Serial No. 396,143. (No model.)

*To all whom it may concern:*

Be it known that I, JOHN A. McDONALD, a citizen of the United States, residing at Britton, in the county of Marshall and State of South Dakota, have invented certain new and useful Improvements in a Combined Horseshoer's Stool and Clincher; and I do hereby declare the following to be a full, clear, and exact description of the invention, such as will enable others skilled in the art to which it appertains to make and use the same.

My invention consists in a combined adjustable horseshoer's stool and clincher, in which are combined an adjustable supporting-plate and means for adjusting the same to the desired height and an adjustable movable clincher for clinching the nails after they have been driven home; and the invention will be hereinafter fully described and claimed.

Referring to the accompanying drawings, Figure 1 is a perspective view illustrating the entire device. Figs. 2 and 3 are detail views which will be hereinafter described.

Referring to the several parts by their designating-numerals, 1 indicates the supporting-base, in which the vertical post or standard 2 is secured. This standard is formed with a central vertical opening 3, in which the supporting-bar 4 is mounted. The upper end of the bar 4 is formed with the socket, in which is seated the lower end of the stem 6 of the supporting-plate 5, on which the horse's hoof rests. It will be seen that by turning the supporting-plate 5 it can be adjusted to the exact point desired in the threaded upper end of the supporting-bar 4.

8 indicates a curved spring, the lower end of which is secured in the standard 2, while its upper end bears up against the lower end of the supporting-bar 4. The bar 4 is provided with a projecting handle 7, adapted to engage in any one of a series of recesses 9, cut in the side of the standard, as shown, and it will be seen that by turning the handle to free it from the notches 9 the supporting-bar 4 can be raised or lowered, the spring 8 assisting in raising in order to adjust the supporting-plate 5 to the desired height. The bar is held at the desired point by turning its handle 7 into the proper recess 9.

10 indicates the collar, which fits upon the round plate-stem 6, so that it can turn readily upon the same, one end of this collar being formed with a slot 11, in which is pivotally mounted on a thumb-screw 12 the inner end 13$^a$ of a straight arm or lever 13. This lever is formed at a suitable distance from its pivotal point with a series of apertures 14 in order to enable the arm 15 to be secured to it at different distances from the end pivotal point of the lever 13, according to the size of the horse's hoof being treated. 15 indicates an arm or lever, which is adjustably pivoted to the straight lever 13 by the pivot-screw 16, the inner end 15$^a$ of the arm 15 being curved upward and formed with a spiral thread. Upon this threaded upwardly-curving end fits adjustably the clamping-block 17, which is formed with an opening 17$^a$. The clamping-block 17 can be turned upon the threaded end 15$^a$ of the lever 15 to bring it to the desired point for clinching the points of the nails driven up through the shoe and hoof and is secured at the desired point to which it is adjusted by means of a thumb-screw 18, the inner end of which is screwed into a vertical groove in the rear side of the threaded arm 15$^a$, thus preventing the clamping-block 17 from turning.

The inner end 13$^a$ of the lever 13 is formed on its flat upper side with the series of transverse corrugations 19, and the inner end of the clamping-block 17 is likewise formed with a series of transverse corrugations 20. The nails having been driven up through the shoe and hoof, the horse's foot is rested upon the supporting-plate 5, and the clinching device is turned around the hoof, (the collar 10 permitting of this movement,) when by pressing the handles of the levers 13 15 together the serrated clamping-block 20 will be pressed down upon the projecting points of the nails rising from the hoof, while the serrated bar 13$^a$ presses up against the heads of the nails and holds them firmly while the clamping-block 17 is clinching their points firmly and smoothly down. The clincher can be turned around the hoof, as before stated, so as to operate on each nail.

From the foregoing description, taken in connection with the accompanying drawings, it is thought that the construction, operation, and practical advantages of my invention will be clearly understood without requiring further description. It will be seen that my device will effect considerable saving in time and labor.

Having thus described my invention, what I claim, and desire to secure by Letters Patent, is—

1. The combination of the standard 2, formed with the vertical opening 3 and the transverse recesses 9, the adjustable supporting-bar 4, having the threaded socket at its upper end and provided with the locking-handle 7, adapted to fit into recesses 9, the supporting-plate 5, having the threaded stem 6 screwing into the threaded socket in the upper end of the supporting-bar, and the elevating-spring 8, arranged as specified, substantially as set forth.

2. The combination, with the standard 2, formed with the vertical opening 3 and the transverse recesses 9, the adjustable supporting-bar 4, having the socket at its upper end and provided with the locking-handle 7, adapted to fit into the recesses 9, the supporting-plate 5, having the stem screwed into the socket in the upper end of the supporting-bar, and the elevating-spring, of the lever 13, having its inner end formed on its upper side with the series of serrations 19, and the lever 15, pivoted to the lever 13 and having its curved inner end provided with a serrated clamping-block 17, substantially as set forth.

3. The combination, with the standard 2, formed with the vertical opening 3 and the transverse recess 9, the adjustable supporting-bar 4, having the socket at its upper end and provided with the locking-handle 7, adapted to fit into the recess 9, the supporting-plate 5, having the stem screwed into the socket in the upper end of the supporting-bar, and the elevating-spring, of the adjustable supporting-plate 5, having the rounded stem 6, the collar 10, fitting and turning on the said stem, the lever 13, pivoted at its inner end to said collar and formed with a series of serrations 19 on its upper side, and the lever 15, pivoted to the lever 13 and having the upwardly-curved inner end provided with a serrated clamping-block, substantially as specified.

In testimony whereof I affix my signature in presence of two witnesses.

JOHN A. McDONALD.

Witnesses:
A. SHERIN,
E. E. WOODFORD.